United States Patent [19]

Allen

[11] Patent Number: 4,623,282

[45] Date of Patent: Nov. 18, 1986

[54] LOCATING ELEMENTS OF CONSTRUCTION BENEATH THE SURFACE OF EARTH SOILS

[76] Inventor: Gordon H. Allen, 1000 Lorraine Rd., #505, Wheaton, Ill. 60187

[21] Appl. No.: 680,961

[22] Filed: Dec. 12, 1984

[51] Int. Cl.⁴ .................. F16L 57/00; G01D 21/00
[52] U.S. Cl. ..................... 405/157; 116/DIG. 14; 405/154
[58] Field of Search .............. 405/157, 154; 116/211, 116/DIG. 14

[56] References Cited

U.S. PATENT DOCUMENTS

| | | | |
|---|---|---|---|
| 3,115,861 | 12/1963 | Allen | 405/157 |
| 3,282,057 | 11/1966 | Prosser | 405/157 |
| 3,327,484 | 6/1967 | Launder et al. | 405/157 |
| 3,339,369 | 9/1967 | Ryan | 405/157 |
| 3,504,503 | 4/1970 | Allen | 405/157 |
| 3,568,626 | 3/1971 | Southworth | 405/157 X |
| 3,633,533 | 1/1972 | Allen | 405/157 X |
| 3,908,582 | 9/1975 | Evett | 405/157 X |

Primary Examiner—Dennis L. Taylor
Attorney, Agent, or Firm—Marshall, O'Toole, Gerstein, Murray & Bicknell

[57] ABSTRACT

Locating underground utility lines or elements of construction with a frangible body or tape. The tape includes printing indicia identifying the type of underground facility with the printing indicia protected from the environment. The tape is color coded to the type of underground facility and has soil contrasting reflective stripes to aid in tape detection.

14 Claims, 7 Drawing Figures

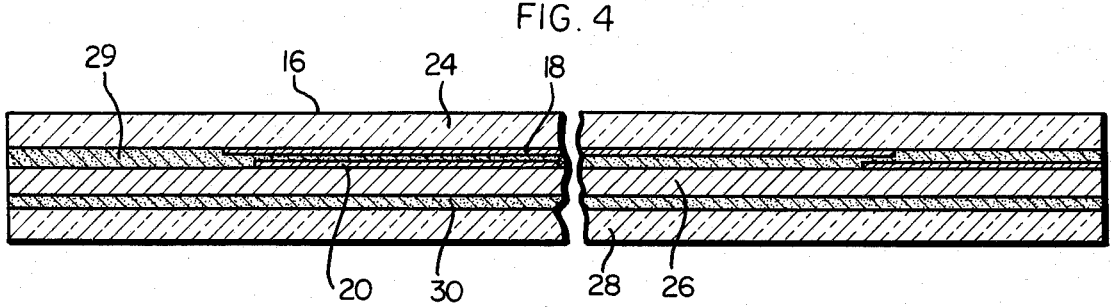
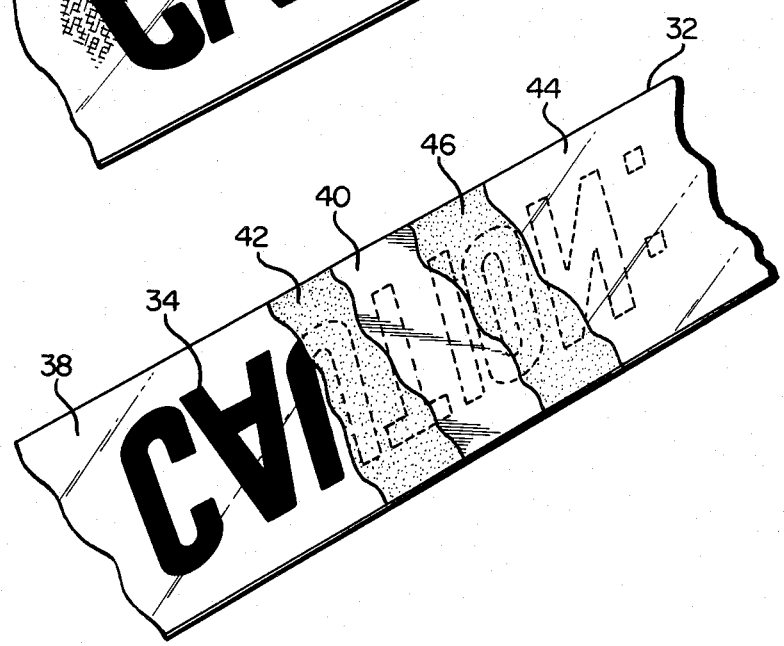
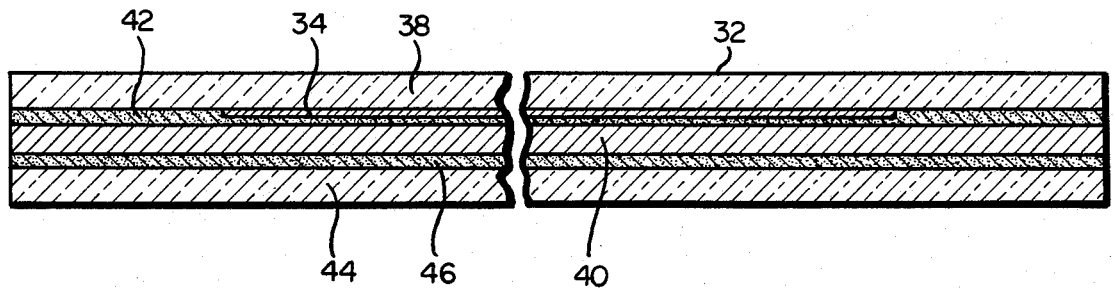

LOCATING ELEMENTS OF CONSTRUCTION BENEATH THE SURFACE OF EARTH SOILS

This invention relates to improvements for facilitating the location of underground utility lines or elements of construction and in particular to utility line locating tapes which are buried with the underground lines or elements, such tapes providing a caution notice and identifying the type of underground line or element associated therewith.

BACKGROUND OF THE INVENTION

Reference may be made to the following U.S. patents of interest: U.S. Pat. Nos. 3,115,861 and 3,504,503.

In my U.S. Pat. No. 3,115,861, a technique is disclosed to aid in the location of underground facilities, utility lines or elements of construction, such as wires, cables, conduit, sewer pipes and sewer connections, valves, water lines, gas lines, and the like, by digging a trench, placing the utility line or element of construction therein, then placing a readily frangible colored body or tape, the color of which contrasts with the surrounding earth soil above the line or element, and then filling the trench with earth. The contrasting color of the frangible tape acts to alert and caution those digging in the earth soil area that a utility line is present.

In my U.S. Pat. No. 3,504,503, there is described an improved technique in which a sheet of a frangible, flexible metal foil in the form of a tape carries a color to contrast with the color of the earth soil adjacent the utility lines or elements of construction. The metal foil can be detected by conventional types of metal detecting devices from above the earth's surface and, hence, the presence and location of the utility line or element of construction can be ascertained from above the surface of the earth.

Later, it was found desirable to provide printed cautionary wording on the frangible bodies or locating tapes, which cautionary wording identifies the type of utility line or element of construction which is associated therewith. Typically, black lettering is printed directly on the frangible body or tape surface which indicates, for instance, "CAUTION: BURIED GAS LINE BELOW". In addition, it was found desirable to correlate and color code the facility locating tape with the type of underground facility being protected. Thus, a uniform color code was developed and has now been generally accepted in the industry to identify underground facilities as follows: Red—electric power lines; Yellow—gas, oil or steam lines; Orange—telephone, police and fire communications, and cable television; Blue—water lines; and Green —sewer lines.

However, the use of printing on the tape face identifying the type of utility element and the use of a prescribed tape color and color code to identify a particular utility element has led to problems in the use of such utility line locating tape elements. It has been found that the cautionary printing placed on the tape surface is vulnerable to being removed by erasure, rubbing off, chemical activity under the ground by hydrocarbons, and by underground electrolysis. Thus, after a period of time, the cautionary printing disappears from the tape due to scratching or rubbing off, and also due to natural causes from the effect of hydrocarbons, or petroleum present under the ground and this renders the supplied cautionary printing indicia useless as a means of identifying the type of utility element supposedly being protected. Several attempts were made to treat the tape surface prior to printing in order to enable the printing to remain indelible, however none of such experimental techniques have solved the problem.

In addition, in certain instances, the coded tape color corresponding to the associated utility line or element of construction does not form a contrast with the surrounding earth soil sufficient to reliably caution one digging in the soil. For example, when a red colored locating tape associated with electric power lines, etc. is placed in red colored soil such as sandstone or reddish clay, the desired contrast between the locating tape color and the surrounding soil is not present. Similarly, orange coded tapes often do not provide sufficient contrast in desert soils, and green coded and blue coded tapes are often problems in heavily forested or shaded areas. In such instances the utility line may be damaged before one views the cautionary locating tape.

Accordingly, it is desired to provide such a utility line locating tape for underground utility lines which tap is detectable from above the earth surface and which contains printing indicia identifying the type of associated utility line and which printing indicia remains indelible on the tape during normal use. In addition, it is desired to provide such a utility line locating tape in which a contrasting color is provided on the tape along with a coded color associated with the particular underground line element being protected so that there is a sufficient contrast between the tape itself and the surrounding soil even under conditions where the coded color does not form such a sufficient contrast.

SUMMARY OF THE INVENTION

In accordance with the principles of the present invention, there is provided a cautionary locating tape for underground facilities, utility lines or elements of construction which includes indelible printing identifying the type of utility line being protected and a color coded to the same type of utility line. The locating tape is in the form of a frangible body comprising a sheet of clear, transparent plastic film on which the printing indicia identifying the underground utility line is placed on one of the film faces. A sheet of flexible metal foil having color coded indicia on one foil face corresponding to the type of underground utility element being protected is then bonded to the clear film face having a printing indicia. Thus, the printing indicia is indelibly provided on the tape and is protected from the environment by the clear film, and both the printing indicia and the tape color coding are visible through the upper, outer face of the clear film.

In accordance with one aspect of the invention, the tape color coding is provided by color coded stripes printed on the metal foil. In this preferred embodiment of the invention, the metal foil includes a highly reflective surface so that highly reflective stripes on the metal foil are formed contrasting with the color coded stripes and also with the soil surrounding the underground utility line. In this preferred embodiment of the invention, the printing indicia, the color coded stripes, and the soil contrast reflective stripes are all visible through the opposite face of the clear film. A second clear film or protective coating may be applied to the bottom side of the metal foil to protect the metal foil from the environment.

In an alternative embodiment of the invention, after the printing indicia is placed on one face of the clear film, a color coded adhesive corresponding to the underground line element is used to bond the metal foil to the clear film face. A protective coating or a sheet of clear film can be applied to the bottom of the metal foil to protect the metal foil from the environment. The printed indicia identifying the underground utility line and the coded color associated with the underground utility line are visible through the upper, outer face of the clear film. The printed indicia is of course, indelibly provided on the tape and it is protected by the clear film from the environment.

Accordingly, the printed indicia cannot be scratched off or removed by abrasion from the tape, nor can the printed indicia be removed by chemical or electrical action when placed in the soil as in the prior art. Furthermore, in the preferred embodiment, even if the coded color for the underground utility line does not contrast with the earth's soil, the soil contrasting reflective stripes provide the necessary contrast with the color coding as well as with the earth's soil so that the tape is readily located and reliably protects the associated underground utility line.

BRIEF DESCRIPTION OF THE DRAWINGS

The invention may be best understood by reference to the following description taken in conjunction with the accompanying drawings, in which like reference numerals identify like elements in the several figures and in which:

FIG. 4 is a sectional view taken along section line 4-4 of FIG. 2 and illustrating the several components forming the preferred tape of FIG. 2;

FIG. 5 is a plan view of an alternative embodiment of the present invention which includes environment protected printing indicia and color coding;

FIG. 6 is a bottom view of the tape of FIG. 5 with the several layers cut-away in staggered form to illustrate the respective tape layers, including clear plastic film with reverse printing indicia on one face, a color coded adhesive, metal foil, color coded adhesive and clear film; and FIG. 7 is a sectional view taken along section line 7-7 of FIG. 5 and illustrating the several components forming the tape of FIG. 5.

DETAILED DESCRIPTION

Figure 1:
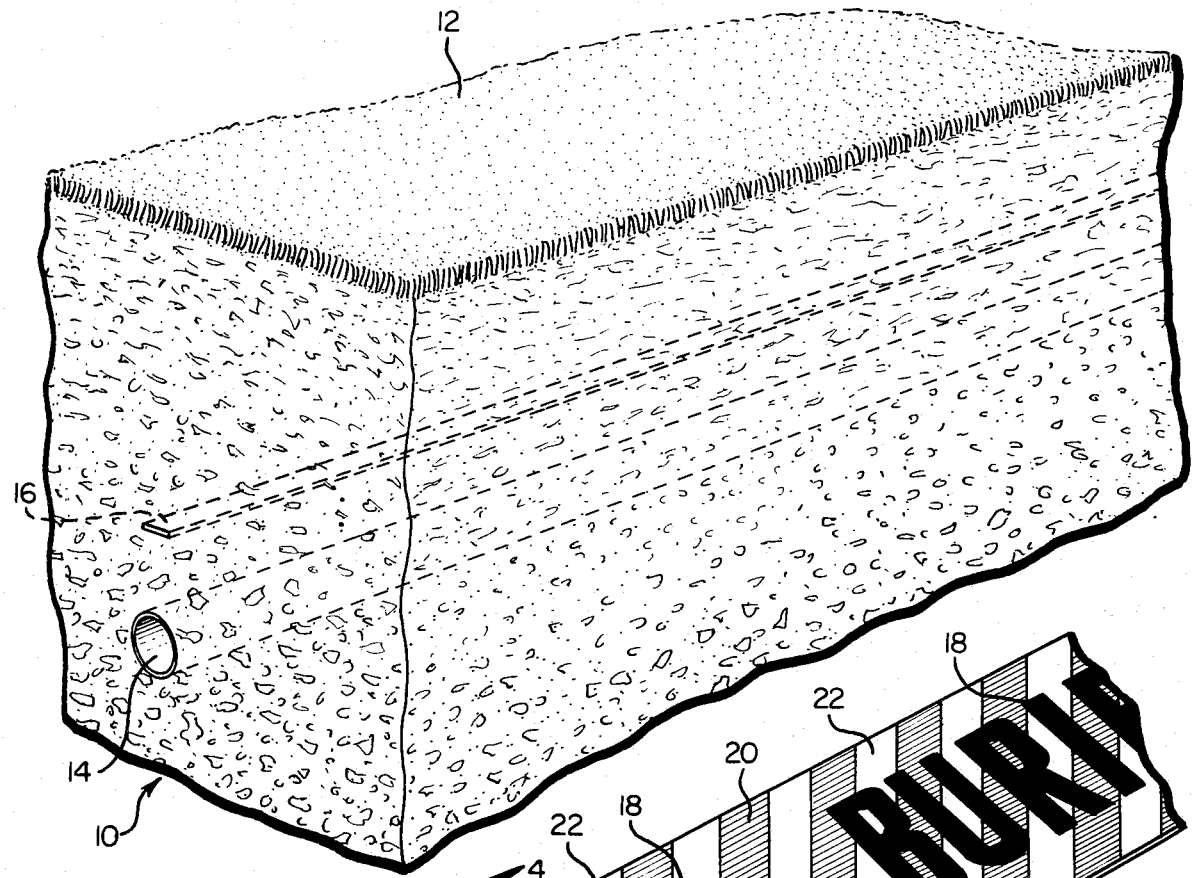
FIG. 1 is a perspective view illustrating an area of earth soil containing an underground utility line or element of construction and above which is provided a utility line locating tape in accordance with the principles of the present invention.

FIG. 1 illustrates an area of earth soil 10 with a top surface of the earth 12 and below which there is located an underground utility line 14 or element or construction. It is to be understood that the reference herein to an underground facility, utility line or element of construction refers to any type of underground facility, line or element, including but not limited to underground gas, electric, telephone, sewer, water or related facilities which may contain outer jackets, pipes or cables of metal, ceramic or plastic materials.

Typically, a trench is excavated, the utility line 14 is located therein, and a locating element or frangible tape 16 is disposed above line 14 in the manner described in my prior U.S. Pat. Nos. 3,115,861 and 3,504,503. Tape 16 includes a metal foil so that the tape may be detected by electronic detecting devices operating from above the earth's surface. In addition, tape 16 includes printing indicia and a coloring coded to the type of utility line 14 being protected. Thus, as described in my aforementioned patents, upon excavating or digging into the earth, tape 16 will be encountered so as to provide a cautionary indication there is an underground utility line below. Reference may then be made to the printed indicia or to the color coding to ascertain the type of utility line 14 being protected.

Figure 2:
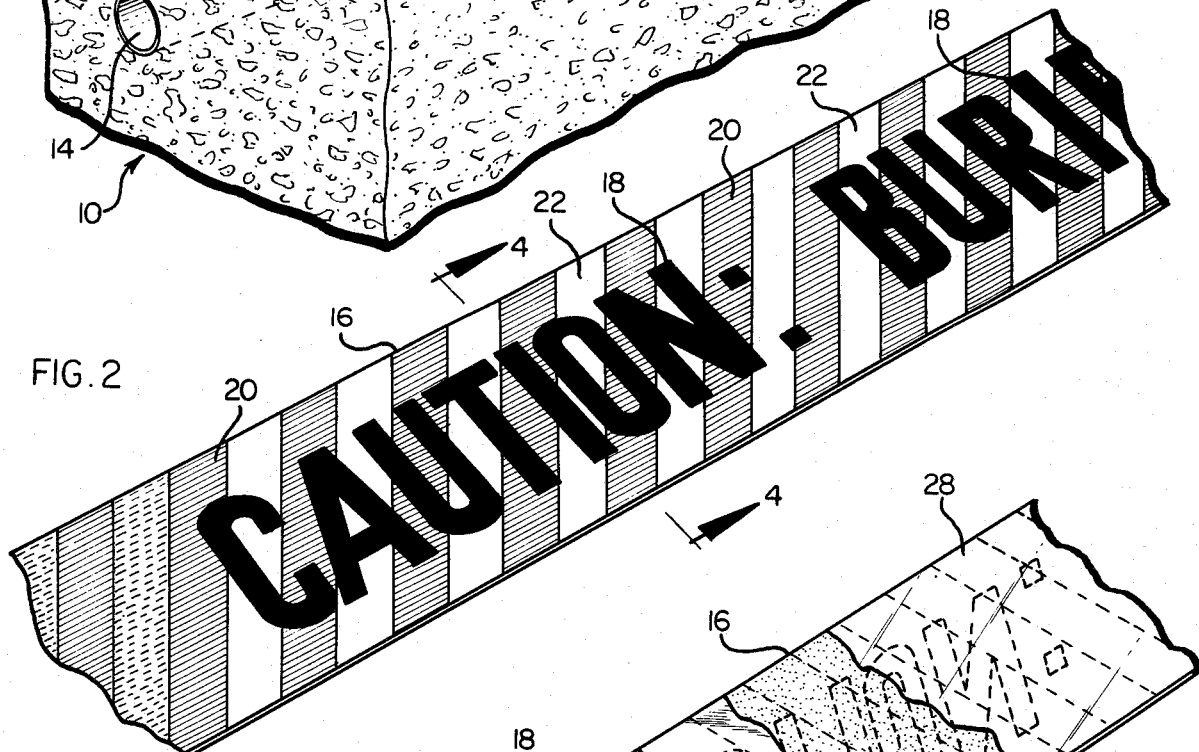
FIG. 2 is a plan view of a portion of a preferred embodiment of the present invention illustrating a locating tape with environment protected printing indicia identifying the underground utility line, color coding associated with the type of underground utility line, and light reflective contrast stripes forming a contrast with the color coding and with the surrounding earth soil.
Figure 3:
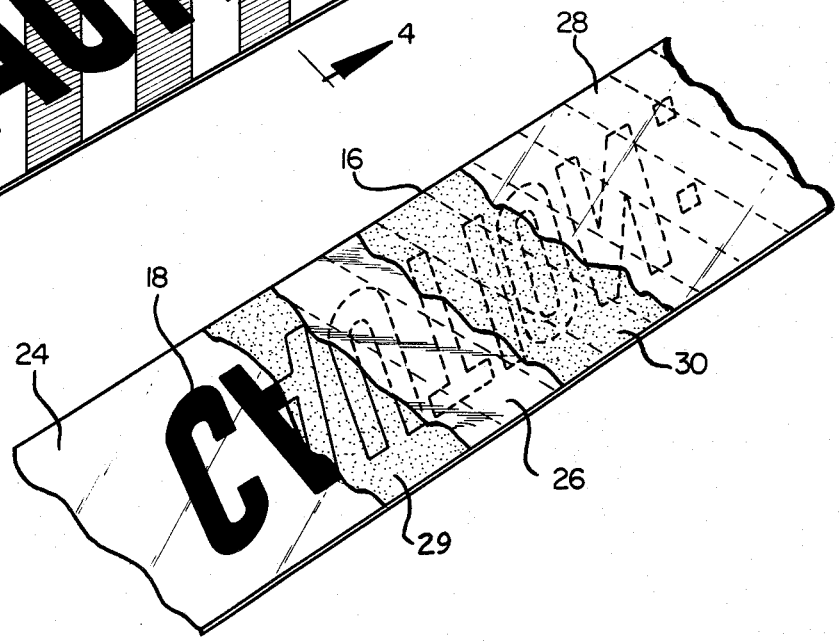
FIG. 3 is a bottom view of the locating tape of FIG. 2 with the several tape layers cut-away in staggered form to illustrate the respective tape layers.

FIGS. 2-4 illustrate a preferred embodiment of tape 16 in accordance with the present invention. With specific reference to FIG. 2, it can be seen that tape 16 includes cautionary printing indicia 18 identifying the type of utility line 14 being protected. As an example, assuming utility line 14 is a water line, cautionary printed indicia 18 on tape 16 would read "CAUTION: BURIED WATER LINE BELOW", and a portion of this cautionary statement is shown in FIG. 2. The cautionary printed indicia repeated on the tape so that it extends the full length of utility line 14. Locating tape 16 also includes cautionary colored coded indicia 20 in the form of colored stripes extending across tape 16. In the illustrated example since line 14 is assumed to be a water line, the cautionary color coded indicia stripes 20 are blue stripes in accordance with the now accepted industry color coding for underground facilities.

Tape 16 further includes cautionary contrast stripes 22 extending across the tape and forming a contrast in color with color coded stripes 20 as well as with the color of the surrounding earth soil 10. Contrast stripes 22 provide a high visibility and high light reflectivity characteristic to tape 16 so that the tape can readily be seen even when placed in earth soils whose color is close to the color of color coded stripes 20. This permits the tape to be readily visible even if for instance, stripes 20 were red and the tape was placed in reddish sandstone or reddish clay to protect an associated electric power line.

Reference may now be made to FIGS. 3 and 4, wherein there will be described the manner in which applicant constructs tape 16 in accordance with the present invention. Initially, a clear plastic film 24 such as polyester film, is formed with printing indicia 18 reverse printed on one side thereof. In the bottom plan view of FIG. 3, printing indicia 18 is reverse printed on one face of film 24, namely the lower, inner face as shown in the sectional view of FIG. 4. A flexible metal foil 26 formed for instance of aluminium with a highly reflective surface is provided with printed color coded stripes 20 so that highly visible and light reflective stripes 22 are formed on the surface of foil 26. The printed surface of foil 26 is then placed adjacent the surface of film 24 containing printing indicia 18 and foil 26 and film 24 are bonded together using an adhesive 29.

With reference to the sectional view of FIG. 4, it can be seen that clear film 24 has printing indicia 18 printed on the film lower, inner face, while foil 26 has color coded stripes 20 printed on the foil upper face. Adhesive 28 bonds plastic film 24 to metal foil 26. Thus, in the view as shown in FIG. 2, printing indicia 18, color coded stripes 20 and soil contrasting reflective stripes 22 are visible through the upper, outer face of film 24. Note that since printing indicia 18 has been reverse printed on the inner face of film 24, the printing indicia is protected by film 24 from the environment and from any accidental or intentional attempts to erase or obliterate the printing indicia. This may be more clearly seen with reference to FIG. 4.

In order to protect the bottom side of foil 26, a plastic coating or other type of protective coating can be placed thereon. It is preferred however, that another sheet of clear film 28 be placed adjacent the bottom of foil 26 and bonded thereto with an adhesive 30. Adhesive 30 may contain a coloring coded to the underground facility so that the tape bottom also displays the coded color indicia.

It may be understood that clear, plastic films 24 and 28 can be formed of the same substance, such as polyester, and different reference numerals have been used in the illustration in order to differentiate film 24 containing printing indicia 18 and film 28 which merely acts to protect foil 26. Similarly, adhesive 28 and adhesive 30 may be formed of the same substance, however, different reference numerals have been used in the illustrations in order to differentiate adhesive 28 which bonds film 24 to foil 26 from adhesive 30 which bonds film 28 to the opposite surface of foil 26.

An alternative embodiment of the invention is illustrated in FIGS. 5-7 in which tape 32 includes printing indicia 34 identifying the type of underground utility line being protected and coded coloring 36 associated with the type of utility line. FIGS. 6 and 7 illustrate the construction details thereof. As in the preferred embodiment of FIGS. 2-4, tape 32 is formed with a clear plastic film 38 such as polyester with printing indicia 34 reverse printed on one side thereof. A sheet of flexible metal foil 40 is bonded to the face of film 38 containing printing indicia 34 by means of a colored adhesive 42 containing a color coded to the type of utility line being protected. In the illustration of tape 32 shown in FIGS. 5-7, color coded indicia 36 is shown as the color orange and printing indicia 34 could read for instance "CAUTION: BURIED TELEPHONE LINE BELOW".

Note particularly, from FIG. 7, that printing indicia 34 is reverse printed on the upper, inner face of film 38 and colored adhesive 42 is located at the upper face of foil 40 to thereby bond foil 40 and film 38. Printing indicia 34 is therefore protected below film 38 in the same manner as the preferred embodiment of FIGS. 2-4. In addition, in the same manner as the preferred embodiment, both printing indicia 34 and the color coded indicia afforded by colored adhesive 42 may be viewed, as shown in FIG. 5, through the upper, outer face of film 38. A protective coating or layer of plastic or resinous material can be placed on the bottom of foil 40 to protect foil 40 from the environment. It is preferred, however, that a sheet of polyester film is bonded to the bottom surface of foil 40 by means of an adhesive 46. If desired, adhesive 46 may also include coloring in the same manner as colored adhesive 36 so that the color coded indicia may be seen both above and below tape 32.

Any of a variety of conventionally available plastic films, metal foils, adhesives and coloring materials may be utilized to form a locating tape in accordance with the principles of the present invention. As examples of such commonly available plastic films, metal foils, etc., reference may be made to my aforementioned U.S. Pat. No. 3,504,503. Similarly, the use of locating tapes is self evident as described herein. Details as to the use of such tapes, if needed, may be obtained from my aforementioned U.S. Patents.

The term "frangible" as used herein and in the claims means that the strength of the locating tape is such that, in conventional digging into the soil, in connection, for instance, with excavating, laying utility lines or elements of construction or cutting into the earth for any other reasons, by means of mechanical or similar digging or excavating equipment such as back hoes and trenchers, if the locating tape is engaged and pulled up by such equipment, the teeth or the like on such equipment will sheer, sever or break the tape and the tape will be ripped from the earth and be pulled loose for several feet along its length.

The foregoing detaled description has been given for clearness of understanding only, and no unnecessary limitations should be understood therefrom, as modifications will be obvious to those skilled in the art.

What is claimed is:

1. In an area of earth soil which carries beneath the surface thereof at least one underground facility and a frangible colored body beneath the surface and located above and overlying the underground facility, the frangible body having a coloring coded to the type of facility and printing identifying the type of facility, the improvement wherein the frangible colored body comprises:

a sheet of clear plastic film having printing indicia in the form of a cautionary phrase on the film lower, inner face visible through the film upper, outer face, the printing indicia identifying the type of underground facility;

a sheet of flexible metal foil bonded to the plastic film lower, inner face, the metal foil having a plurality of color coded striped indicia on the foil upper, inner face, each of the color coded striped indicia having a color coded to correspond to the type of underground facility and being visible through the plastic film upper, outer face; and a plurality of light reflective stripes on the foil upper, inner face being visible through the plastic film upper, outer face, and contrasting with the color coded striped indicia and with the surrounding earth soil to provide high visibility of said frangible body under a variety of earth soil color conditions.

2. The improvement according to claim 1, including a protective coating on the foil lower face.

3. The improvement according to claim 2, wherein the protective coating comprises a sheet of clear plastic film bonded to the foil lower face.

4. The improvement according to claim 1, wherein the color coded striped indicia comprises a colored adhesive applied between the foil upper, inner face and the film lower, inner face.

5. The improvement according to claim 4, including a protective coating on the foil lower face.

6. The improvement according to claim 5, wherein the protective coating comprises a second sheet of plastic film bonded to the foil lower face.

7. The improvement according to claim 6, wherein the second sheet of plastic film and foil are bonded with a colored adhesive color coded to the type of underground facility.

8. A frangible colored body for burial with an underground facility and useful in the location and presence of said underground facility, said frangible colored body comprising:
- a sheet of clear plastic film;
- a cautionary word phrase on the film lower, inner face visible through the film upper, outer face, the cautionary word phrase identifying the type of underground facility;
- a sheet of flexible metal foil bonded to the plastic film lower, inner face, and covering said cautionary word phrase to protect said word phrase from the environment on the bottom, with the word phrase being protected from the environment on the top by said sheet of plastic film;
- a plurality of color coded striped indicia on the foil upper, inner face, each of the color coded striped indicia color coded to correspond to the type of underground facility and being visible through the plastic film upper, outer face; and
- a plurality of reflective stripes on the foil upper, inner face being visible through the plastic film. upper, outer face, and contrasting with the color coded striped indicia and with the surrounding earth soil so as to be visible under a variety of earth soil color conditions.

9. A frangible colored body according to claim 8, wherein each of said color coded striped indicia alternates along the foil with each of said reflective stripes.

10. A frangible colored body according to claim 9, including a protective coating on the foil lower face.

11. A frangible colored body according to claim 8, wherein the color coded striped indicia comprises a colored adhesive applied between the foil upper, inner face and the film lower, inner face.

12. A frangible colored body according to claim 11, including a protective coating on the foil lower face.

13. A frangible colored body according to claim 12, wherein the protective coating comprises a second sheet of plastic film bonded to the foil lower face.

14. A frangible colored body according to claim 13, wherein the second sheet of plastic film and foil are bonded with a colored adhesive color coded to the type of underground facility.

* * * * *